Figure 1:
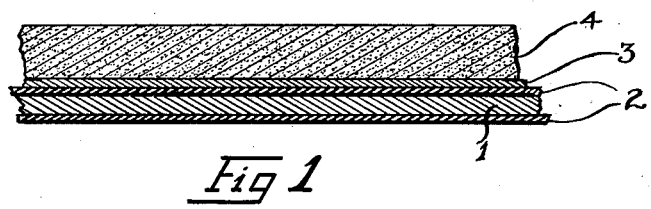

Oct. 10, 1933.  C. S. MINER  1,929,601

DUPLICATING SHEET

Filed May 27, 1931

INVENTOR
Carl S. Miner
Jones, Addington, Ames & Seibold
ATTORNEYS

Patented Oct. 10, 1933

1,929,601

UNITED STATES PATENT OFFICE 1,929,601

DUPLICATING SHEET

Carl S. Miner, Chicago, Ill., assignor to Charles H. Joy, Jr., Chicago, Ill.

Application May 27, 1931. Serial No. 540,514

5 Claims. (Cl. 41—31.6)

In the manufacture of that type of duplicating hectograph roll which consists of a duplicating composition consisting substantially of glue, glycerine and water attached to a backing of treated paper, it has been the custom heretofore to lacquer only one side of this paper because of the impossibility of securing satisfactory adherence between lacquered paper and the duplicating composition. Lacquering the paper on both sides before putting on the duplicating composition would have the advantage of preventing moisture and ink from penetrating into the paper and increasing its tendency to deteriorate during long periods, but because of the difficulty of securing adherence between lacquered paper and the duplicating composition, it has not been possible heretofore to lacquer that side of the paper to which the duplicating composition is applied.

The object of this invention is to provide a method by which duplicating materials of normal composition, that is, those containing glue, glycerine and water may be made to adhere firmly to lacquered paper backing. In the drawing the figure shows a cross-section of a hectograph sheet in which use is made of my invention. In carrying out my invention, I first impregnate the paper 1 with a thin glue-glycerine-water solution as has been the practice heretofore and dry the impregnated paper. I then coat it on both sides with lacquer 2. Ordinary clear lacquers are suitable for this purpose or I may use a lacquer composed as follows:—

7.5#—Cellulose nitrate (for instance materials known in the trade as "pyroxylin" or "one-half second cotton").
92.5#—Ethyl acetate
8.6#—Castor oil
2.3#—Dibutyl phthalate I allow the lacquer coating to dry but preferably not absolutely completely. On one side of the lacquer coated paper I spread a very thin layer of a special adhesive composition 3 which will adhere to the pyroxylin coating on the one hand and the gelatine-glue composition on the other. Such an adhesive should preferably contain a solvent for nitrocellulose such for example as cellosolve (ethylene, glycol, monoethyl, ether,) butyl acetate or the like and a non-solvent wetting agent for the lacquer surface such as alcohol, together with glue and a plasticizer for glue such for example as Turkey red oil, glycerine or a glycol. Such an adhesive may be composed as follows:

13.5#—Glue (grade 10-10)
14.7#—75% singly sulfonated Turkey red oil
14.6#—Cellosolve
22.9#—Alcohol
34.3#—Water After allowing this adhesive composition to dry, the duplicating composition 4 is applied to it, preferably by pouring. It is preferable prior to the pouring operation to heat the backing to substantially the same temperature as that of the duplicating composition which is to be poured onto it. A suitable temperature for this purpose is 140° F. A duplicating sheet or roll made up in this way will not weaken during use because the pyroxylin coating on the side next to the duplicating composition prevents moisture and ink from penetrating into the paper base and the pyroxylin coating itself acts as an absorption medium for the ink which is applied to the surface of the duplicating composition in connection with the duplicating operations and thus aids in clearing the duplicating composition and thus facilitates its reuse.

This special method of obtaining adherence between the lacquered surfaces of the paper and the duplicating composition results in an extremely firm bond such that the duplicating composition is weaker than the bond between it and the lacquer.

Numerous changes can be made in the above process without departing from the scope of my invention and it is understood that the detailed example given above is to be interpreted as illustrating and not as limiting the scope of the invention. It will be understood, of course, that my process of attaching the duplicating composition to a lacquered surface is applicable not only to cases where the backing consists of impregnated and lacquered paper as described herein but also that it can be utilized equally well and without material modification for attaching duplicating compositions to lacquered cloth backing which may be substiuted for the paper backing in the manufacture of duplicating rolls.

I claim:

1. A process of making duplicating rolls which comprises coating a backing on both sides with lacquer, applying a binding agent comprising solvents for both lacquer and duplicating composition to at least one lacquer coating and applying the duplicating composition to the binding agent.

2. A process of making duplicating rolls which comprises coating a backing on both sides with lacquer, applying a binding agent comprising glue, a glue plasticizing agent, a glue solvent, a nitrocellulose solvent and a non-solvent wetting agent for lacquer to at least one of said lacquer coatings and applying the duplicating composition to said binding agent.

3. A duplicator sheet comprising a flexible backing, a moisture-proof lacquer coating applied on at least one side of said backing, and a layer of duplicating composition applied on said lacquer, and means for securing said duplicating composition layer to said lacquer layer comprising an adhesive containing a solvent for material in the duplicating composition, and a solvent for material in the lacquer.

4. A method of making duplicator sheets comprising the steps of coating a flexible backing with lacquer, coating the lacquer with a binding agent containing solvents for both the lacquer and duplicating composition, and applying a layer of the duplicating composition to the binding agent.

5. A method of making duplicator sheets comprising the steps of coating a backing with lacquer, coating the lacquer with a binding agent containing solvents both for material in the lacquer and for material in the duplicating composition, and applying a layer of the duplicating composition to the binding agent.

CARL S. MINER.